(12) United States Patent
Shigematsu et al.

(10) Patent No.: US 12,451,583 B2
(45) Date of Patent: Oct. 21, 2025

(54) POWER SPLITTER AND COMMUNICATION APPARATUS

(71) Applicant: Murata Manufacturing Co., Ltd., Nagaokakyo (JP)

(72) Inventors: Satoshi Shigematsu, Nagaokakyo (JP); Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 316 days.

(21) Appl. No.: 18/225,778

(22) Filed: Jul. 25, 2023

(65) Prior Publication Data

US 2023/0369735 A1    Nov. 16, 2023

Related U.S. Application Data

(63) Continuation of application No. PCT/JP2022/004152, filed on Feb. 3, 2022.

(30) Foreign Application Priority Data

Feb. 12, 2021    (JP) .................. 2021-020380

(51) Int. Cl.
| | |
|---|---|
| *H04B 1/40* | (2015.01) |
| *H01P 1/18* | (2006.01) |
| *H01P 5/19* | (2006.01) |
| *H04B 1/00* | (2006.01) |
| *H04B 1/04* | (2006.01) |

(52) U.S. Cl.
CPC .................. *H01P 5/19* (2013.01); *H01P 1/18* (2013.01); *H04B 1/0483* (2013.01)

(58) Field of Classification Search
CPC ..... H01P 5/19; H01P 1/18; H01P 5/16; H03H 7/09; H03H 7/18; H03H 7/48; H04B 1/0483; H04B 10/614; H04B 1/04; H04B 1/16; H04B 1/40; H04B 1/0053; H04B 1/0057
See application file for complete search history.

(56) References Cited

U.S. PATENT DOCUMENTS

| | | | |
|---|---|---|---|
| 11,387,801 B1 * | 7/2022 | Khlat | ................. H03H 7/40 |
| 11,616,298 B2 * | 3/2023 | Tsai | ................. H01Q 1/2291 |
| | | | 343/893 |
| 12,034,198 B2 * | 7/2024 | Golat | ................. H01P 5/16 |

(Continued)

FOREIGN PATENT DOCUMENTS

| | | |
|---|---|---|
| JP | 2010154138 A | 7/2010 |
| JP | 2017534228 A | 11/2017 |

OTHER PUBLICATIONS

International Search Report in PCT/JP2022/004152, mailed Mar. 22, 2022, 3 pages.

(Continued)

*Primary Examiner* — Andrew Wendell
(74) *Attorney, Agent, or Firm* — Keating & Bennett, LLP

(57) ABSTRACT

A power splitter includes a common port, a first port, a second port, a first phase shifter connected between the common port and the first port, and a second phase shifter connected between the common port and the second port. The first phase shifter includes a first capacitor, a first inductor, and a second inductor. The second phase shifter includes a second capacitor, a third inductor, and a fourth inductor.

20 Claims, 7 Drawing Sheets

(56) References Cited

U.S. PATENT DOCUMENTS

| | | | |
|---|---|---|---|
| 2011/0063045 A1 | 3/2011 | Jones et al. | |
| 2013/0194023 A1* | 8/2013 | Ahmed | H03F 3/19 |
| | | | 327/360 |
| 2014/0364077 A1 | 12/2014 | Maxim et al. | |
| 2016/0126921 A1 | 5/2016 | Hur et al. | |
| 2017/0201218 A1* | 7/2017 | Wang | H04B 1/401 |
| 2018/0205358 A1* | 7/2018 | Onaka | H04B 1/006 |
| 2022/0109220 A1* | 4/2022 | Gorbachov | H01Q 21/0006 |
| 2022/0190793 A1* | 6/2022 | Chen | H03F 1/565 |
| 2022/0231642 A1* | 7/2022 | Kao | H03F 3/72 |
| 2023/0030569 A1* | 2/2023 | Kim | H03H 7/48 |
| 2023/0106157 A1* | 4/2023 | Fukunaga | H01Q 3/24 |
| | | | 343/702 |

OTHER PUBLICATIONS

Written Opinion in PCT/JP2022/004152, mailed Mar. 22, 2022, 3 pages.

* cited by examiner

POWER SPLITTER AND COMMUNICATION APPARATUS

CROSS REFERENCE TO RELATED APPLICATIONS

This application claims the benefit of priority to Japanese Patent Application No. 2021-020380 filed on Feb. 12, 2021 and is a Continuation Application of PCT Application No. PCT/JP2022/004152 filed on Feb. 3, 2022. The entire contents of each application are hereby incorporated herein by reference.

BACKGROUND OF THE INVENTION

1. Field of the Invention

The present invention relates to a power splitter that splits a signal input into a common port to multiple ports and a communication apparatus including the power splitter.

2. Description of the Related Art

For example, in a communication terminal device typified by a mobile phone, a compact power splitter with high isolation is desirably configured in general.

A Wilkinson power divider (Wilkinson coupler) is generally used as a typical power splitter in related art. Japanese Unexamined Patent Application Publication No. 2017-534228 discloses the Wilkinson power divider.

FIG. 10 is a circuit diagram of a Wilkinson power divider. This power divider is including transmission lines TL1 and TL2 and a resistive element R0. This power divider equally splits a signal input into a common port P0 to a first port P1 and a second port P2. Alternatively, this power divider combines a signal input into the first port P1 with a signal input into the second port P2 to output the combined signal to the common port P0.

When impedance of the common port P0, the first port P1, and the second port P2 are represented by Z0, the transmission lines TL1 and TL2 are ¼-wavelength transmission lines having characteristic impedance of √2Z0 and the impedance of the resistive element R0 is 2Z0. Since the potential occurring at both ends of the resistive element R0 between the first port P1 and the second port P2 is cancelled out by 0-degree voltage flowing through the resistive element R0 and 180-degree voltage propagated through the transmission lines TL1 and TL2, the first port P1 is isolated from the second port P2.

FIG. 11 is a circuit diagram of a power splitter in which the transmission lines TL1 and TL2 in the Wilkinson power divider illustrated in FIG. 10 are replaced with LC circuits LC1 and LC2. The LC circuits LC1 and LC2 each have inductance and capacitance that are defined so as to rotate the phase by 90 degrees at a certain frequency.

SUMMARY OF THE INVENTION

As illustrated in FIG. 10, the power divider using the transmission lines TL1 and TL2 requires a lot of space for forming the transmission lines TL1 and TL2. In addition, since the line length of the transmission line is $\lambda/4$ at a certain center frequency, the amount of phase rotation is more shifted as the frequency is more shifted from the certain center frequency. Accordingly, it is not possible to achieve high isolation over a wide band.

In contrast, in the case of the configuration in which the phase shift circuits are including the LC circuits, as illustrated in FIG. 11, the isolation is degraded as the frequency is more shifted from the center frequency due to frequency-phase shift characteristics of the LC circuits LC1 and LC2.

Preferred embodiments of the present invention provide power splitters each having isolation ensured over a wide band and communication apparatuses including the power splitters.

A power splitter according to a preferred embodiment of the present invention includes a common port, a first port, a second port, a first phase shifter connected between the common port and the first port, and a second phase shifter connected between the common port and the second port. The first phase shifter includes a first capacitor connected in series between the common port and the first port, a first inductor connected between the common port, an end portion at the common port side of the first capacitor, and a ground, and a second inductor connected between the first port, an end portion at the first port side of the first capacitor, and the ground. The first inductor is magnetically coupled to the second inductor. The second phase shifter includes a second capacitor connected in series between the common port and the second port, a third inductor connected between the common port, an end portion at the common port side of the second capacitor, and the ground, and a fourth inductor connected between the second port, an end portion at the second port side of the second capacitor, and the ground. The third inductor is magnetically coupled to the fourth inductor.

With the above configuration, it is possible to reduce the frequency dependence of the amounts of phase shift (the amounts of phase change) of the first phase shifter and the second phase shifter to keep a certain amount of phase shift over a wide band.

A communication apparatus according to a preferred embodiment of the present invention includes a radio-frequency circuit and an antenna connected to the radio-frequency circuit. The power splitter is provided between the radio-frequency circuit and the antenna.

Preferred embodiments of the present invention provide power splitters each having isolation ensured over a wide band and communication apparatuses including the power splitters.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
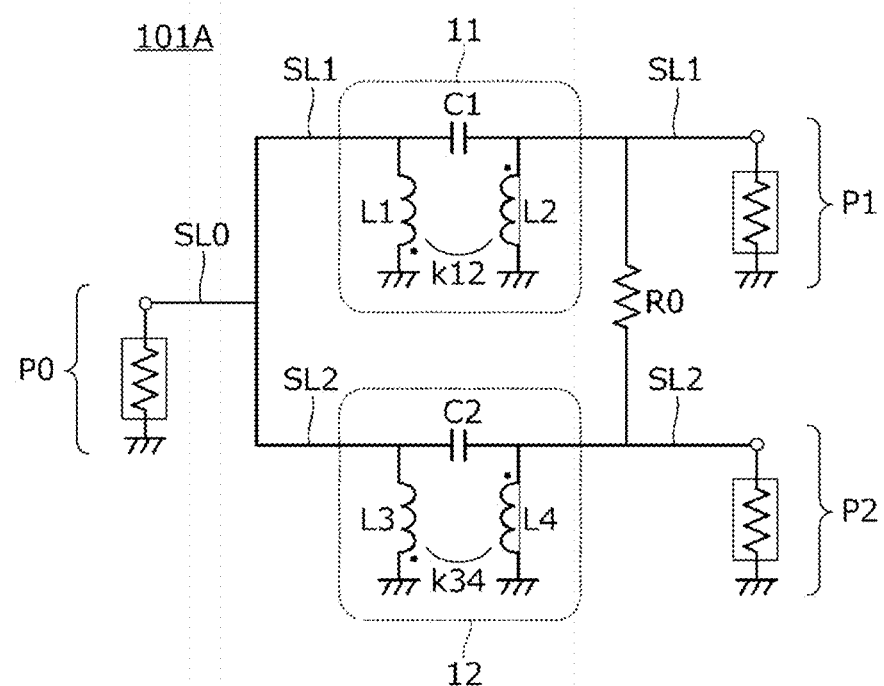
FIG. 1 is a circuit diagram of a power splitter 101A according to a first preferred embodiment of the present invention.

Multiple preferred embodiments of the present invention will herein be described using several examples with reference to the drawings. The same reference numerals and letters are added in the respective drawings to identify the same components. In a second preferred embodiment and subsequent preferred embodiments, a description of points common to a first preferred embodiment is omitted and points different from the first preferred embodiment will be described. In particular, the same effects and advantages given by the same components are not successively described in each preferred embodiment.

First Preferred Embodiment

FIG. 1 is a circuit diagram of a power splitter 101A according to a first preferred embodiment. The power splitter 101A includes a common port P0, a first port P1, and a second port P2 and splits a signal input into the common port P0 to the first port P1 and the second port P2. In addition, the power splitter 101A combines signals input into the first port P1 and the second port P2 to output the combined signal to the common port P0.

The common port P0 is connected to a common signal line SL0, the first port P1 is connected to a first signal line SL1, and the second port P2 is connected to a second signal line SL2.

Referring to FIG. 1, resistive elements surrounded by rectangles represent characteristic impedances of the corresponding lines and have a value of, for example, about 50Ω. The resistive elements surrounded by the rectangles are not essential components of the power splitter 101A and are illustrated to illustrate the characteristic impedances at the respective ports.

The power splitter 101A includes a first phase shifter 11 connected between the common port P0 and the first port P1 and a second phase shifter 12 connected between the common port P0 and the second port P2. When the characteristic impedances of the lines connected to the first port P1 and the second port P2 are represented by Z0, the impedance of a resistive element R0 is 2Z0 (for example, about 100Ω).

The first phase shifter 11 includes a first capacitor C1 connected in series between the common port P0 and the first port P1, a first inductor L1 connected between the common port P0, an end portion at the common port P0 side of the first capacitor C1, and ground, and a second inductor L2 connected between the first port P1, an end portion at the first port P1 side of the first capacitor C1, and the ground.

The first inductor is cumulatively connected to the second inductor. The state in which the first inductor is cumulatively connected to the second inductor is a connection state in which the direction of the magnetic field occurring at the first inductor is the same as the direction of the magnetic field occurring at the second inductor.

Similarly, the second phase shifter 12 includes a second capacitor C2 connected in series between the common port P0 and the second port P2, a third inductor L3 connected between the common port P0, an end portion at the common port P0 side of the second capacitor C2, and the ground, and a fourth inductor L4 connected between a point between the second port P2 and the second capacitor C2 and the ground. The third inductor is cumulatively connected to the fourth inductor.

The first inductor L1 is magnetically coupled to the second inductor L2 at a coupling coefficient k12, and the first inductor L1 is cumulatively connected to the second inductor L2. The third inductor L3 is magnetically coupled to the fourth inductor L4 at a coupling coefficient k34, and the third inductor L3 is cumulatively connected to the fourth inductor L4.

Since the first inductor L1 and the second inductor L2 define a transformer, the frequency dependence of the amount of phase shift is low. In other words, phase conversion and impedance conversion with a small amount of variation are performed over a wide band. Similarly, since the third inductor L3 and the fourth inductor L4 define a transformer, the frequency dependence of the amount of phase shift is low and the phase conversion and the impedance conversion are performed over a wide band.

The respective elements have, for example, the following values:

L1: about 4.4 nH
L2: about 3.2 nH
C1: about 0.15 pF
C2: about 0.15 pF

The first phase shifter 11 and the second phase shifter 12 rotate their phases by 90 degrees at a certain frequency. Since the potential occurring at both ends of the resistive element R0 between the first port P1 and the second port P2 is cancelled out by 0-degree voltage occurring at the resistive element R0 and 180-degree voltage propagated through the first phase shifter 11 and the second phase shifter 12, isolation characteristics between the first port P1 and the second port P2 are improved.

As described above, since the frequency dependence of the amounts of phase shift of the first phase shifter 11 and the second phase shifter 12 is low, it is possible to improve the isolation characteristics over a wide band.

Figure 2:
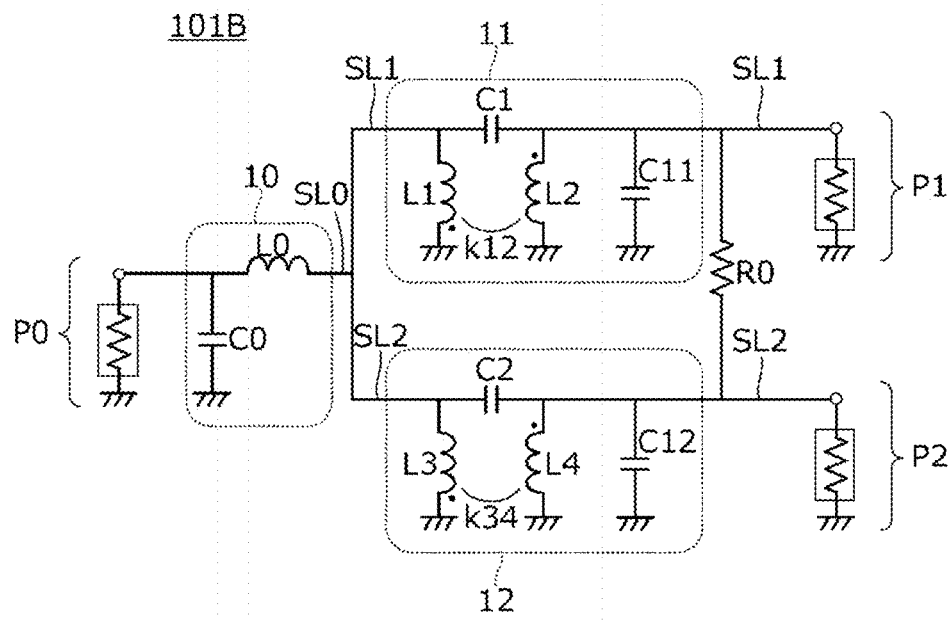
FIG. 2 is a circuit diagram of another power splitter 101B according to the first preferred embodiment of the present invention.

FIG. 2 is a circuit diagram of another power splitter 101B according to the first preferred embodiment. The power splitter 101B includes the common port P0, the first port P1, and the second port P2 and splits a signal input into the common port P0 to the first port P1 and the second port P2. In addition, the power splitter 101B combines signals input into the first port P1 and the second port P2 to output the combined signal to the common port P0.

The common port P0 is connected to the common signal line SL0, the first port P1 is connected to the first signal line SL1, and the second port P2 is connected to the second signal line SL2.

Referring to FIG. 2, resistive elements surrounded by rectangles represent the characteristic impedances of the corresponding lines and have a value of, for example, about 50Ω. The resistive elements surrounded by rectangles are not essential components of the power splitter 101B, as in FIG. 1.

The power splitter 101B includes the first phase shifter 11 connected between the common port P0 and the first port P1 and the second phase shifter 12 connected between the common port P0 and the second port P2.

The first phase shifter 11 includes the first capacitor C1 connected in series between the common port P0 and the first port P1, the first inductor L1 connected between the common port P0, the end portion at the common port P0 side of the first capacitor C1, and the ground, and the second inductor L2 connected between the first port P1, the end portion at the first port P1 side of the first capacitor C1, and the ground. A capacitor C11 is a circuit element representing a parasitic capacitance occurring between the first inductor and the second inductor in the transformer including the first inductor L1 and the second inductor L2.

Similarly, the second phase shifter 12 includes the second capacitor C2 connected in series between the common port P0 and the second port P2, the third inductor L3 connected between the common port P0, the end portion at the common port P0 side of the second capacitor C2, and the ground, and the fourth inductor L4 connected between the second port P2, an end portion at the second port P2 side of the second capacitor C2, and the ground. A capacitor C12 is a circuit element representing a parasitic capacitance component occurring between the third inductor and the fourth inductor in the transformer including the third inductor L3 and the fourth inductor L4.

The power splitter 101B illustrated in FIG. 2 includes an LC circuit 10, in addition to the components in the power splitter 101A illustrated in FIG. 1.

The respective elements have, for example, the following values:

L1: about 3.7 nH
L2: about 3.8 nH
C1: about 0.2 pF
C2: about 0.2 pF
L0: about 0.7 nH
C0: about 0.4 pF
C11: about 0.1 pF
C12: about 0.1 pF The Wilkinson power divider may include a line having a length of about λ/4 at the input side in order to achieve impedance matching at the input side. The LC circuit 10 illustrated in FIG. 2 is a circuit in which the line having a length of about λ/4 is replaced with the LC circuit. The isolation characteristics are improved by achieving the impedance matching with an impedance matching circuit, which is the LC circuit.

Although the example is illustrated in FIG. 2 in which the capacitor C11 connected between the first signal line SL1 and the ground is including the parasitic capacitance of the transformer including the first inductor L1 and the second inductor L2, a capacitor may be provided, in addition to the transformer. Similarly, although the example is illustrated in which the capacitor C12 connected between the second signal line SL2 and the ground includes the parasitic capacitance of the transformer including the third inductor L3 and the fourth inductor L4, a capacitor may be provided, in addition to the transformer. The same applies to the other preferred embodiments described below.

Since the capacitors C11 and C12 are capable of fine-tuning the division ratio of the signal to be split into the first port P1 and the second port P2 with their capacitances, the output balance of the signals to be split into the first port P1 and the second port P2 may be adjusted with the capacitances of the capacitors C11 and C12.

Although the examples are described in the preferred embodiments described above in which the first inductor L1 is cumulatively connected to the second inductor L2 and the third inductor L3 is cumulatively connected to the fourth inductor L4, the first inductor L1 may be differentially connected to the second inductor L2 and the third inductor L3 may be differentially connected to the fourth inductor L4. The same applies to the preferred embodiments described below. The differential connection of the inductors means a connection state in which the directions of the magnetic fields occurring at the respective inductors are opposite to each other.

Second Preferred Embodiment

A power splitter having a decreased number of inductors of the phase shifters will be exemplified in a second preferred embodiment.

Figure 3:
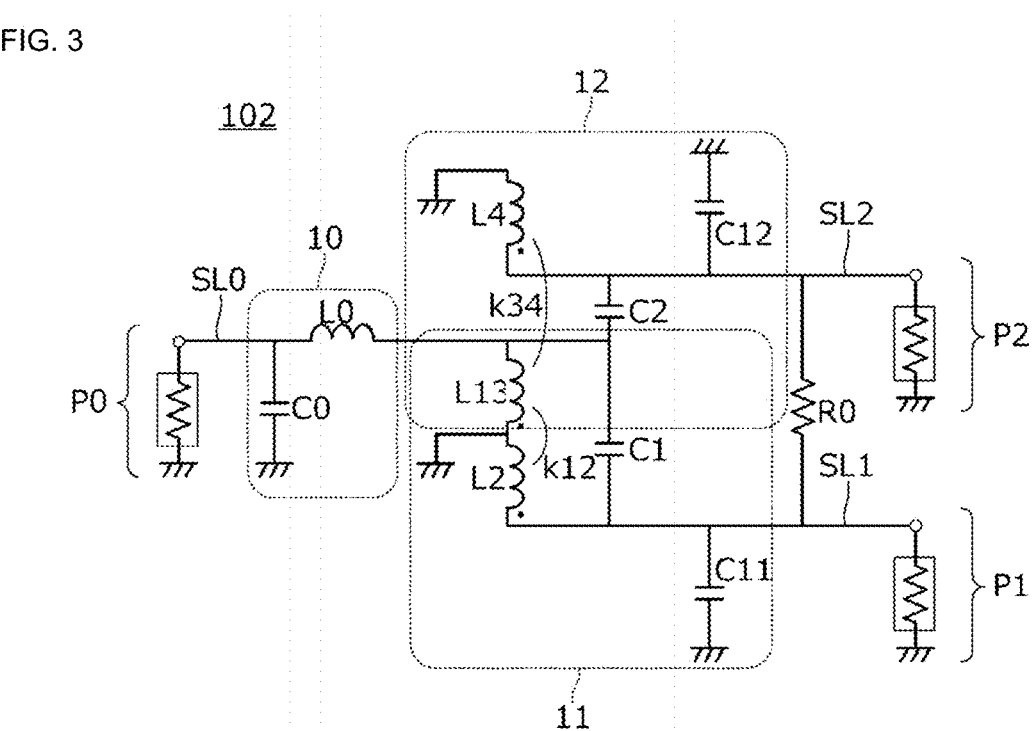
FIG. 3 is a circuit diagram of a power splitter 102 according to a second preferred embodiment of the present invention.

FIG. 3 is a circuit diagram of a power splitter 102 according to the second preferred embodiment. The power splitter 102 includes the common port P0, the first port P1, and the second port P2 and splits a signal input into the common port P0 to the first port P1 and the second port P2. In addition, the power splitter 102 combines signals input into the first port P1 and the second port P2 to output the combined signal to the common port P0.

The common port P0 is connected to the common signal line SL0, the first port P1 is connected to the first signal line SL1, and the second port P2 is connected to the second signal line SL2. Referring to FIG. 3, resistive elements surrounded by rectangles represent the characteristic impedances of the corresponding lines and are not essential components of the power splitter 102.

The power splitter 102 includes the first phase shifter 11 connected between the common port P0 and the first port P1 and the second phase shifter 12 connected between the common port P0 and the second port P2.

The first phase shifter 11 includes the first capacitor C1 connected in series between the common port P0 and the first port P1, an inductor L13 connected between the common port P0, the end portion at the common port P0 side of the first capacitor C1, and the ground, and the second inductor L2 connected between the first port P1, the end portion at the first port P1 side of the first capacitor C1, and the ground. The capacitor C11 is a circuit element representing a parasitic capacitance component occurring at a transformer including the inductor L13 and the second inductor L2.

Similarly, the second phase shifter 12 includes the second capacitor C2 connected in series between the common port P0 and the second port P2, the inductor L13 connected between the common port P0, the end portion at the common port P0 side of the second capacitor C2, and the ground, and the fourth inductor L4 connected between the second port P2, the end portion at the second port P2 side of the second capacitor C2, and the ground. The capacitor C12 is a circuit element representing a parasitic capacitance component occurring at a transformer including the inductor L13 and the fourth inductor L4.

In the power splitter 102, the inductor L13 defines and functions as both the first inductor and the third inductor according to a preferred embodiment of the present invention. The inductor L13 is magnetically coupled to the second inductor L2 at the coupling coefficient k12 and the inductor L13 is cumulatively connected to the second inductor L2.

The inductor L13 is magnetically coupled to the fourth inductor L4 at the coupling coefficient k34 and the inductor L13 is cumulatively connected to the fourth inductor L4.

Since the inductor L13 defines and functions as both the first inductor and the third inductor in the present preferred embodiment, the number of the inductors is decreased to facilitate adjustment of the coupling between the inductor L13 and the second inductor L2 and the coupling between the inductor L13 and the fourth inductor L4.

Figure 4:
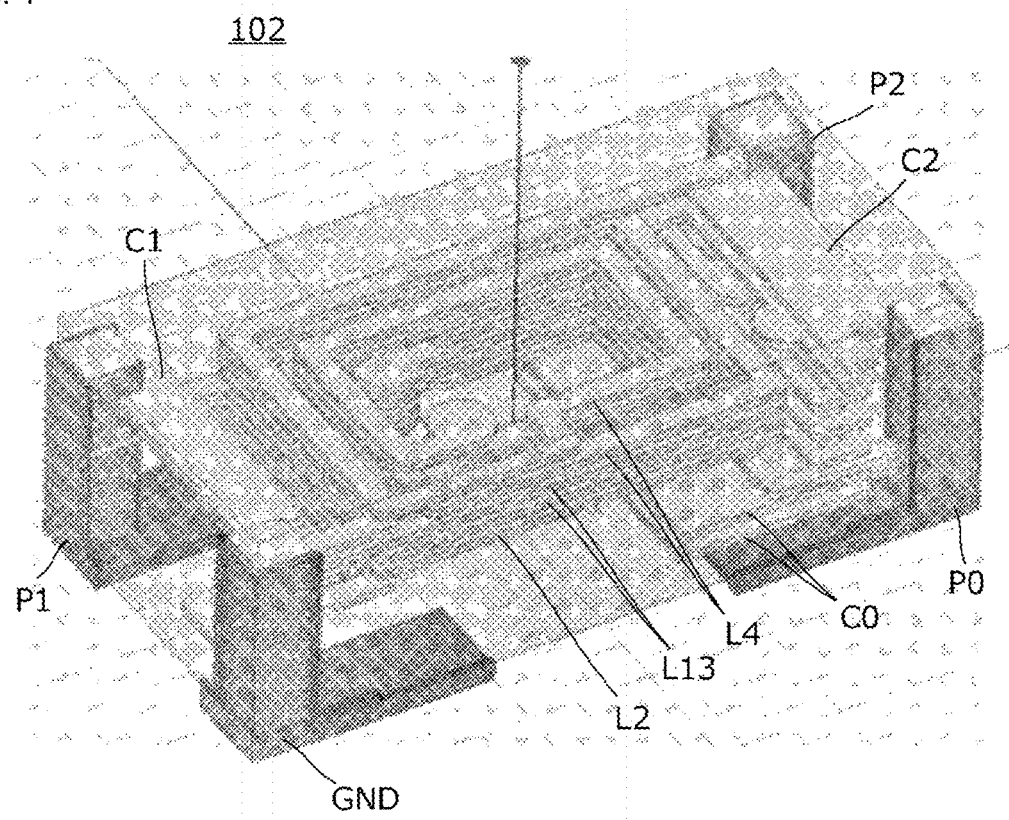
FIG. 4 is a perspective view illustrating the internal configuration of the power splitter 102.

FIG. 4 is a perspective view illustrating the internal configuration of the power splitter 102. The power splitter 102 is a multilayer body having multiple dielectric layers laminated therein. Terminals defining the ports P0, P1, P2 and GND are exposed from the bottom surface of the multilayer body. The inductors L2, L13, and L4, the capacitors C0, C1 and C2, and so on are defined by conductive patterns in the multilayer body. The conductive patterns are provided on the main surfaces of the respective dielectric layers and are made of metal, such as Ag or Cu.

In the power splitter illustrated in FIG. 4, the respective terminals on the bottom surface of the multilayer body are electrically connected to side electrodes provided on the side surfaces of the multilayer body. Since such a structure increases the mounting area when the power splitter 102 is mounted on a circuit board or the like that is separately prepared with solder or the like, it is possible to improve the mounting strength. Although the electrodes are provided on the side surfaces and the bottom surface of the multilayer body, no electrode is provided on the top surface of the multilayer body. With this structure, the extent of the magnetic field occurring at the inductors arranged in the multilayer body is not disturbed by the electrodes on the top surface of the multilayer body to improve the characteristics, such as the Q value, of the inductors.

Figure 5:
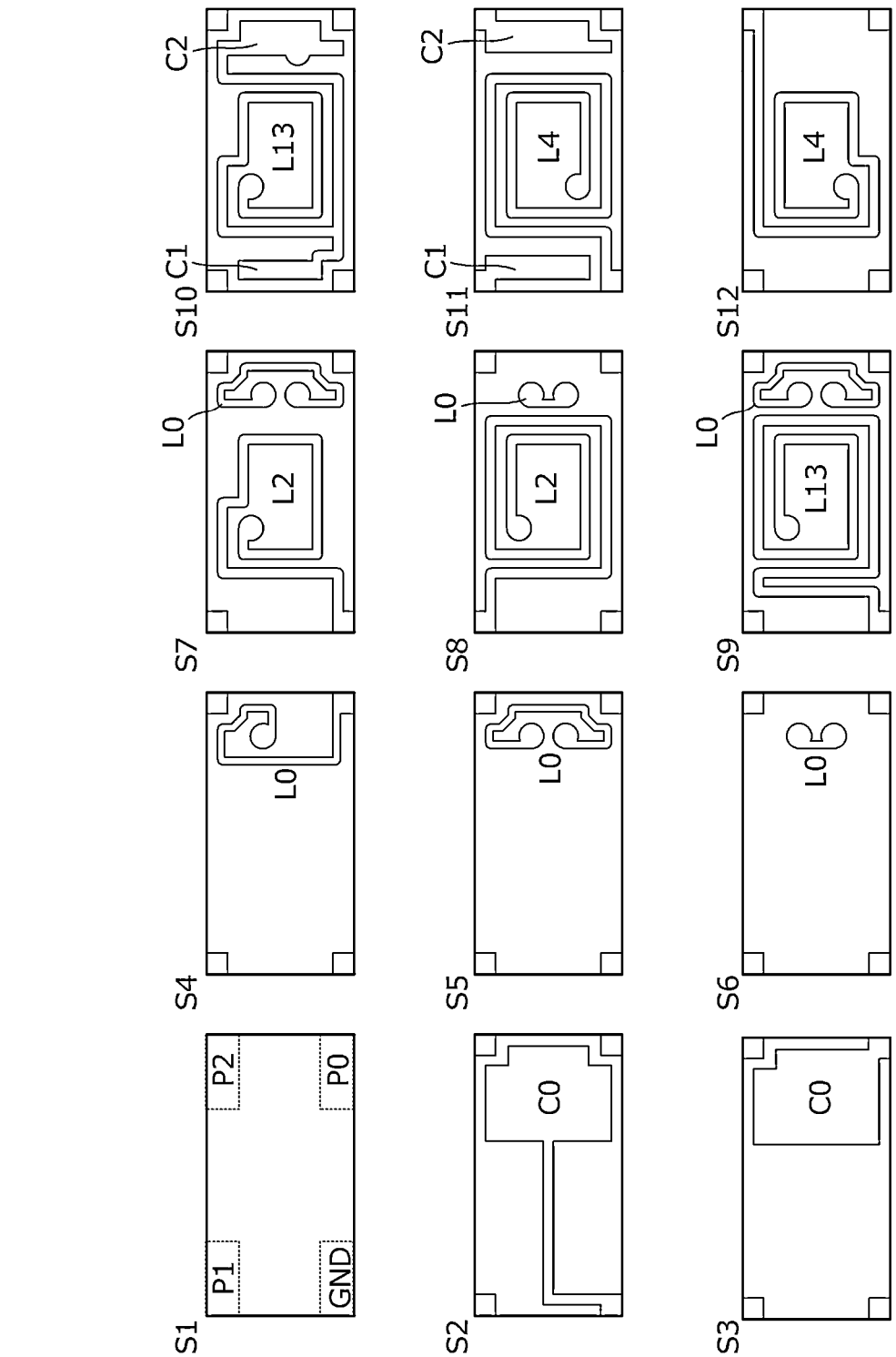
FIG. 5 is an exploded plan view of the power splitter 102.

FIG. 5 is an exploded plan view illustrating the conductive patterns of the respective dielectric layers of the power splitter 102. Referring to FIG. 5, an S1 layer is the bottom layer and an S12 layer is the top layer, among the layers having the conductive patterns formed thereon. Illustration of the layers above the S12 layer is omitted in FIG. 5. Terminals P0, P1, P2 and GND are provided on the lower surface of the S1 layer. The electrodes of the capacitor C0 are provided on an S2 layer and an S3 layer. The conductive patterns of an inductor L0 are provided on an S4 layer to an S9 layer. The electrodes of the capacitor C1 and the capacitor C2 are provided on an S10 layer and an S11 layer. The conductive patterns of the inductor L2 are provided on the S7 layer and the S8 layer, the conductive patterns of the inductor L13 are provided on the S9 layer and the S10 layer, and the conductive patterns of the inductor L4 are provided on the S11 layer and the S12 layer.

The power splitter 102 is mounted on the circuit board or the like that is separately prepared with solder or the like using the terminals realizing the ports P0, P1, P2 and GND, which are provided on the lower surface of the S1 layer, to be electrically connected to the circuit board. In addition, in the power splitter 102, the capacitors are arranged at a side closer to the layer mounted on the circuit board in the laminating direction of the chip and the inductors are arranged at a side far from the circuit board in the laminating direction of the chip, as illustrated in FIG. 5. With such a configuration, the magnetic field occurring at the inductors is not disturbed by the capacitor electrodes in the power splitter 102, a ground electrode provided on the ground electrode, and so on to reduce degradation of the characteristics of the inductors.

As apparent from FIG. 4 and FIG. 5, inductor conductive patterns of the inductor L13, which are a one-side inductor commonly used for the two transformers included in the power splitter 102, are arranged between inductor conductive patterns of the inductor L2 and inductor conductive patterns of the inductor L4, which are the other-side inductors of the respective transformers in the laminating direction of the multilayer body. With such a configuration, the magnetic-field coupling between the inductor L13 and the inductor L2 and the magnetic-field coupling between the inductor L13 and the inductor L4 are capable of being strengthened. In addition, since the conductive patterns of the inductor L2 and the conductive patterns of the inductor L4, which define different transformers, are arranged with the conductive patterns of the inductor L13 sandwiched therebetween, it is possible to reduce the magnetic-field coupling between the inductors of different transformers to improve the isolation characteristics between the first port P1 and the second port P2.

The conductive patterns of the inductor L13 are arranged on the S9 layer and the S10 layer, and the conductive pattern for the inductor L2 is adjacent in the laminating direction of the conductive pattern provided on the S9 layer. The conductive pattern for the inductor L4 is adjacent in the laminating direction of the conductor pattern provided on the S10 layer. Since the conductive patterns for the inductor L13 are arranged on the two layers and the conductive pattern of the inductor L2 and the conductive pattern of the inductor L4, which define the different transformers, are arranged so as to be adjacent to the conductive patterns of the inductor L13, it is possible to strengthen the magnetic-field coupling as the transformers and to improve the isolation characteristics between the first port P1 and the second port P2.

Referring to FIG. 5, the conductive pattern of the inductor L13, which is provided on the S9 layer, and the conductive pattern of the inductor L2, which is provided on the S8 layer adjacent to the S9 layer, are spiral-shaped in a plan view from the main surface of the multilayer body and are arranged so as to be overlapped with each other in the line length direction of the conductive patterns. The arrangement of the conductive patterns of the inductors of the transformers so as be overlapped with each other in the above manner facilitates the coupling between the magnetic fields occurring at the respective inductors to strengthen the magnetic-field coupling as the transformers.

Figure 6:
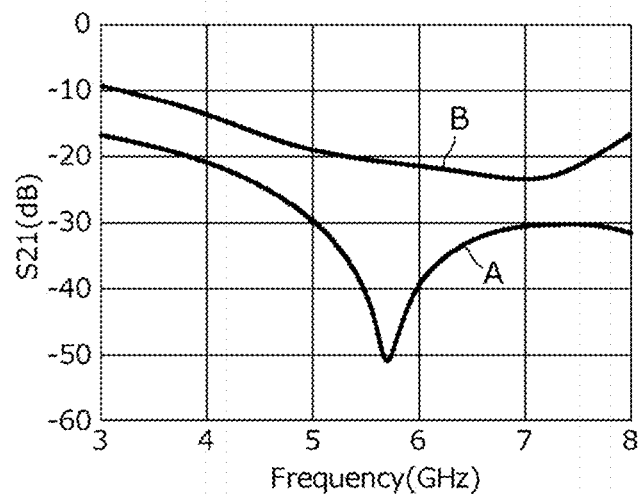
FIG. 6 illustrates a frequency characteristic of isolation between a first port P1 and a second port P2 of the power splitter 102 of a preferred embodiment of the present invention (line A) and a frequency characteristic of isolation between the first port P1 and the second port P2 of a power splitter of a comparative example (line B).
Figure 11:
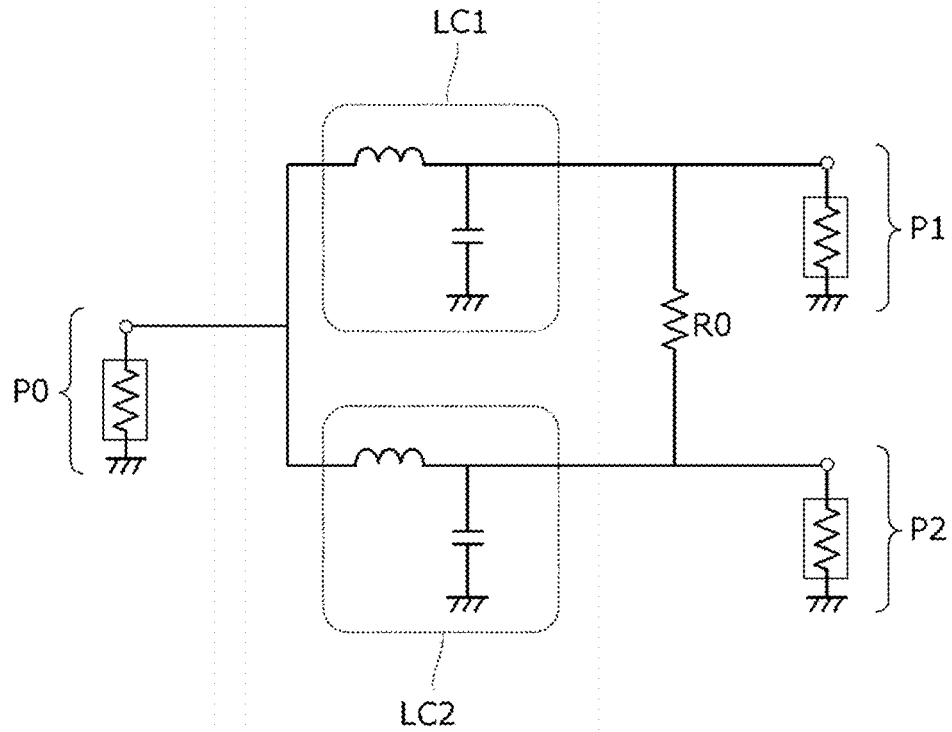
FIG. 11 is a circuit diagram of a power splitter in which transmission lines TL1 and TL2 in the Wilkinson power divider illustrated in FIG. 10 are replaced LC circuits LC1 and LC2.

Line A in FIG. 6 illustrates a frequency characteristic of isolation between the first port P1 and the second port P2 of the power splitter 102 of the present preferred embodiment. Line B in FIG. 6 indicates a frequency characteristic of isolation between the first port P1 and the second port P2 of a power splitter of a comparative example. The power splitter of the comparative example is a power splitter that performs phase shift using the LC circuits LC1 and LC2 illustrated in FIG. 11. In the power splitter of the comparative example, the isolation between the first port P1 and the second port P2 at a 5.6-GHz band, which is a used frequency band, is about −21 dB. In contrast, in the power splitter 102 of the present preferred embodiment, the isolation between the first port P1 and the second port P2 at a 5.6-GHz band, which is the used frequency band, is about −50 dB. As described above, the high isolation characteristic is achieved according to the present preferred embodiment.

Although the inductor L13 may be differentially connected to the second inductor L2 and the inductor L13 may be differentially connected to the fourth inductor L4, as described in the first preferred embodiment, the cumulative connection between the inductor L13 and the second inductor L2 and the cumulative connection between the inductor L13 and fourth inductor L4 facilitate the design when the power splitter 102 is integrally formed as a rectangular parallelepiped element.

Third Preferred Embodiment

A power splitter having a configuration in which one inductor of one transformer, among the two transformers of the phase shifters, is coupled to one inductor of the other transformer will be exemplified in a third preferred embodiment.

Figure 7:
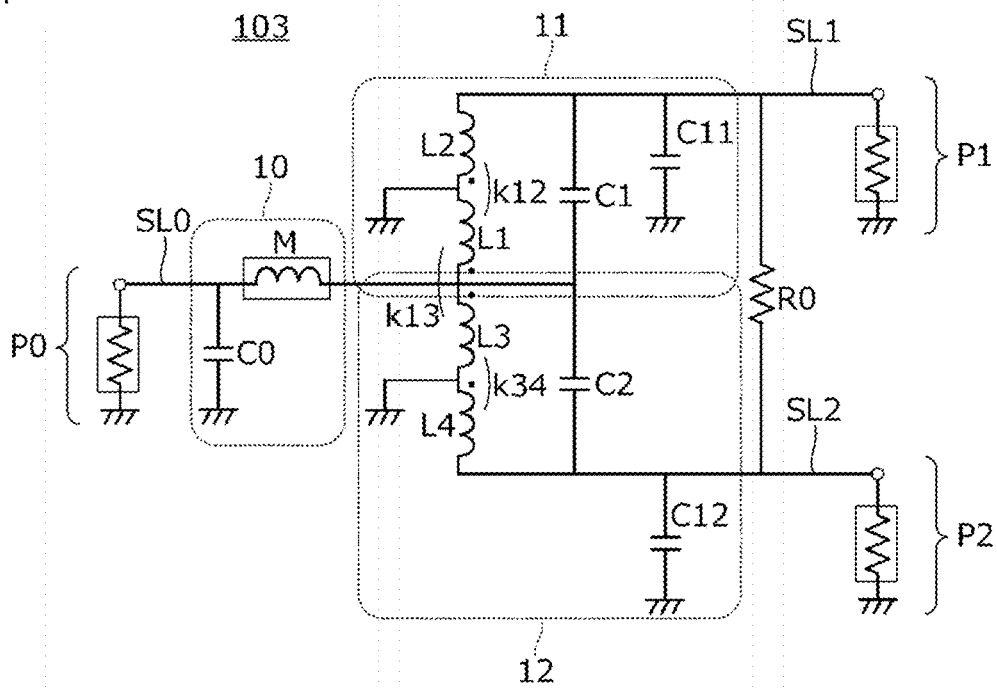
FIG. 7 is a circuit diagram of a power splitter 103 according to a third preferred embodiment of the present invention.

FIG. 7 is a circuit diagram of a power splitter 103 according to the third preferred embodiment. The power splitter 103 includes the common port P0, the first port P1, and the second port P2 and splits a signal input into the common port P0 to the first port P1 and the second port P2. In addition, the power splitter 103 combines signals input into the first port P1 and the second port P2 to output the combined signal to the common port P0.

The common port P0 is connected to the common signal line SL0, the first port P1 is connected to the first signal line SL1, and the second port P2 is connected to the second signal line SL2. Referring to FIG. 7, resistive elements surrounded by rectangles represent the characteristic impedances of the corresponding lines and are not essential components of the power splitter 103.

The power splitter 103 includes the first phase shifter 11 connected between the common port P0 and the first port P1 and the second phase shifter 12 connected between the common port P0 and the second port P2.

The first phase shifter 11 includes the first capacitor C1, the first inductor L1, the second inductor L2, and the capacitor C11. The first capacitor C1 is connected between the common port P0 and the first port P1 and is connected in parallel to the first inductor L1 and the second inductor L2. The first inductor L1 is connected between the common port P0 and the ground. The second inductor L2 is connected between the first port P1 and the ground. The capacitor C11 is a circuit element representing a parasitic capacitance component occurring at the transformer including the first inductor L1 and the second inductor L2.

Similarly, the second phase shifter 12 includes the second capacitor C2, the third inductor L3, the fourth inductor L4, and the capacitor C12. The second capacitor C2 is connected between the common port P0 and the second port P2 and is connected in parallel to the third inductor L3 and the fourth inductor L4. The third inductor L3 is connected between the common port P0 and the ground. The fourth inductor L4 is connected between the second port P2 and the ground. The capacitor C12 is a circuit element representing a parasitic capacitance component occurring at the transformer including the third inductor L3 and the fourth inductor L4.

The first inductor L1 is magnetically coupled to the second inductor L2 at the coupling coefficient k12 and the first inductor L1 is cumulatively connected to the second inductor L2. The third inductor L3 is magnetically coupled to the fourth inductor L4 at the coupling coefficient k34 and the third inductor L3 is cumulatively connected to the fourth inductor L4. The first inductor L1 is magnetically coupled to the third inductor L3 at a coupling coefficient k13. The magnetic-field coupling between the first inductor L1 and the third inductor L3 is the differential connection to cause mutual inductance M. The inductor M illustrated in FIG. 7 is a circuit element representing the mutual inductance. In the power splitter 103, the inductor M and the capacitor C0 defines the LC circuit 10.

As described in the present preferred embodiment, the mutual inductance, which is caused by coupling one inductor of one transformer, among the two transformers of the phase shifters, to one inductor of the other transformer, may be used. This reduces equivalent series resistance to reduce passband loss (insertion loss (I.L.)).

Fourth Preferred Embodiment

A power splitter that includes multiple stages of phase shifters and that performs division with an unequal division ratio will be exemplified in a fourth preferred embodiment.

Figure 8:
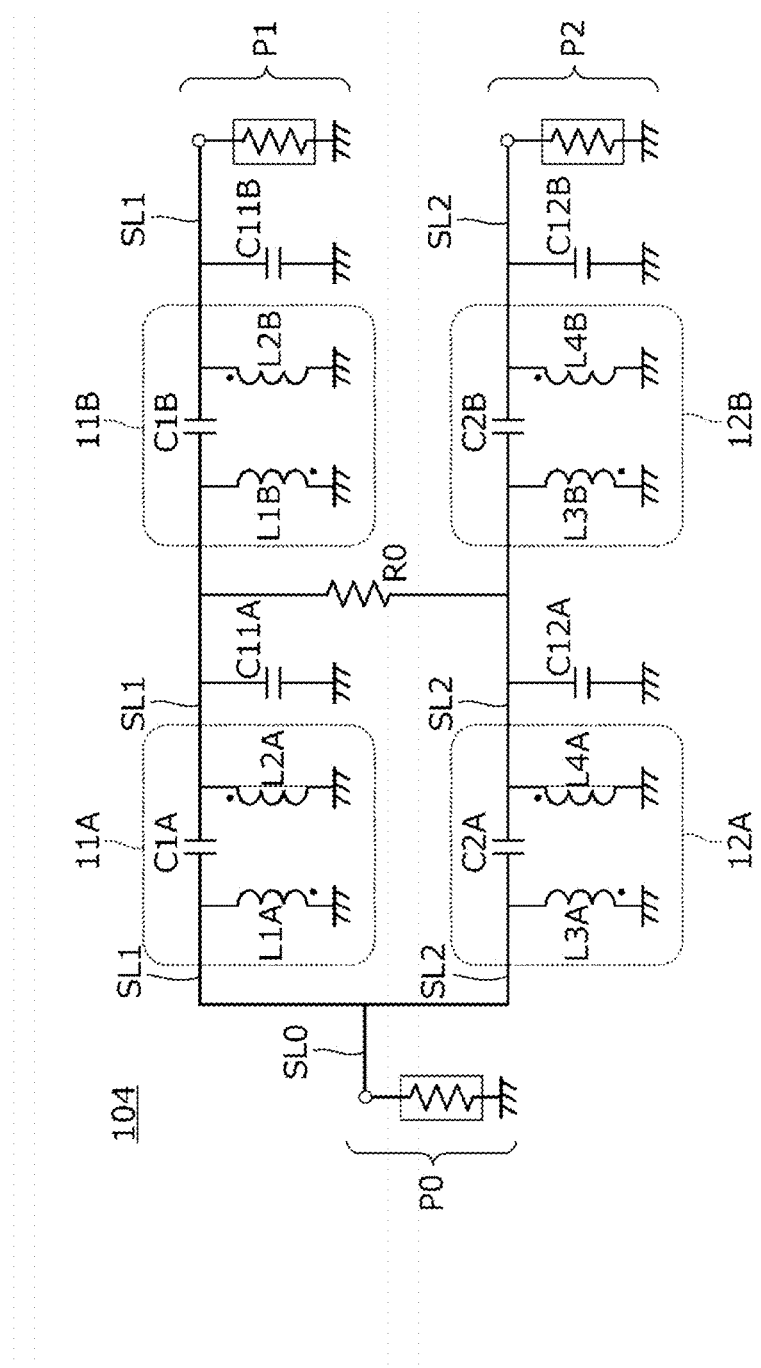
FIG. 8 is a circuit diagram of a power splitter 104 according to a fourth preferred embodiment of the present invention.

FIG. 8 is a circuit diagram of a power splitter 104 according to the fourth preferred embodiment. The power splitter 104 includes the common port P0, the first port P1, and the second port P2 and splits a signal input into the common port P0 to the first port P1 and the second port P2. In addition, the power splitter 104 combines signals input into the first port P1 and the second port P2 to output the combined signal to the common port P0.

The common port P0 is connected to the common signal line SL0, the first port P1 is connected to the first signal line SL1, and the second port P2 is connected to the second signal line SL2. Referring to FIG. 8, resistive elements surrounded by rectangles represent the characteristic impedances of the corresponding lines and are not essential components of the power splitter 104.

The power splitter 104 includes first phase shifters 11A and 11B connected between the common port P0 and the first port P1 and second phase shifters 12A and 12B connected between the common port P0 and the second port P2.

The first phase shifter 11A includes a first capacitor C1A connected in series between the common port P0 and the first port P1, a first inductor L1A connected between the common port P0, an end portion at the common port P0 side of the first capacitor C1A, and the ground, and a second inductor L2A connected between the first port P1, an end portion at the first port P1 side of the first capacitor C1A, and the ground. A capacitor C11A is a circuit element representing a parasitic capacitance component occurring at a transformer including the first inductor L1A and the second inductor L2A.

Another first phase shifter 11B includes a first capacitor C1B connected in series between the common port P0 and the first port P1, a first inductor L1B connected between the common port P0, an end portion at the common port P0 side of the first capacitor C1B, and the ground, and a second inductor L2B connected between the first port P1, an end portion at the first port P1 side of the first capacitor C1B, and the ground. A capacitor C11B is a circuit element representing a parasitic capacitance component occurring at a transformer including the first inductor L1B and the second inductor L2B.

The second phase shifter 12A includes a second capacitor C2A connected in series between the common port P0 and the second port P2, a third inductor L3A connected between the common port P0, an end portion at the common port P0 side of the second capacitor C2A, and the ground, and a fourth inductor L4A connected between the second port P2, an end portion at the second port P2 side of the second capacitor C2A, and the ground. A capacitor C12A is a circuit element representing a parasitic capacitance component occurring at a transformer including the third inductor L3A and the fourth inductor L4A.

Another second phase shifter 12B includes a second capacitor C2B connected in series between the common port P0 and the second port P2, a third inductor L3B connected between the common port P0, an end portion at the common port P0 side of the second capacitor C2B, and the ground, and a fourth inductor L4B connected between the second port P2, an end portion at the second port P2 side of the second capacitor C2B, and the ground. A capacitor C12B is a circuit element representing a parasitic capacitance component occurring at a transformer including the third inductor L3B and the fourth inductor L4B.

Arranging the multiple phase shifters in each signal path, as in the present preferred embodiment, enables the amount of phase change of each phase shifter to be finely set to improve the accuracy of phase change on each signal path.

Fifth Preferred Embodiment

Figure 9:
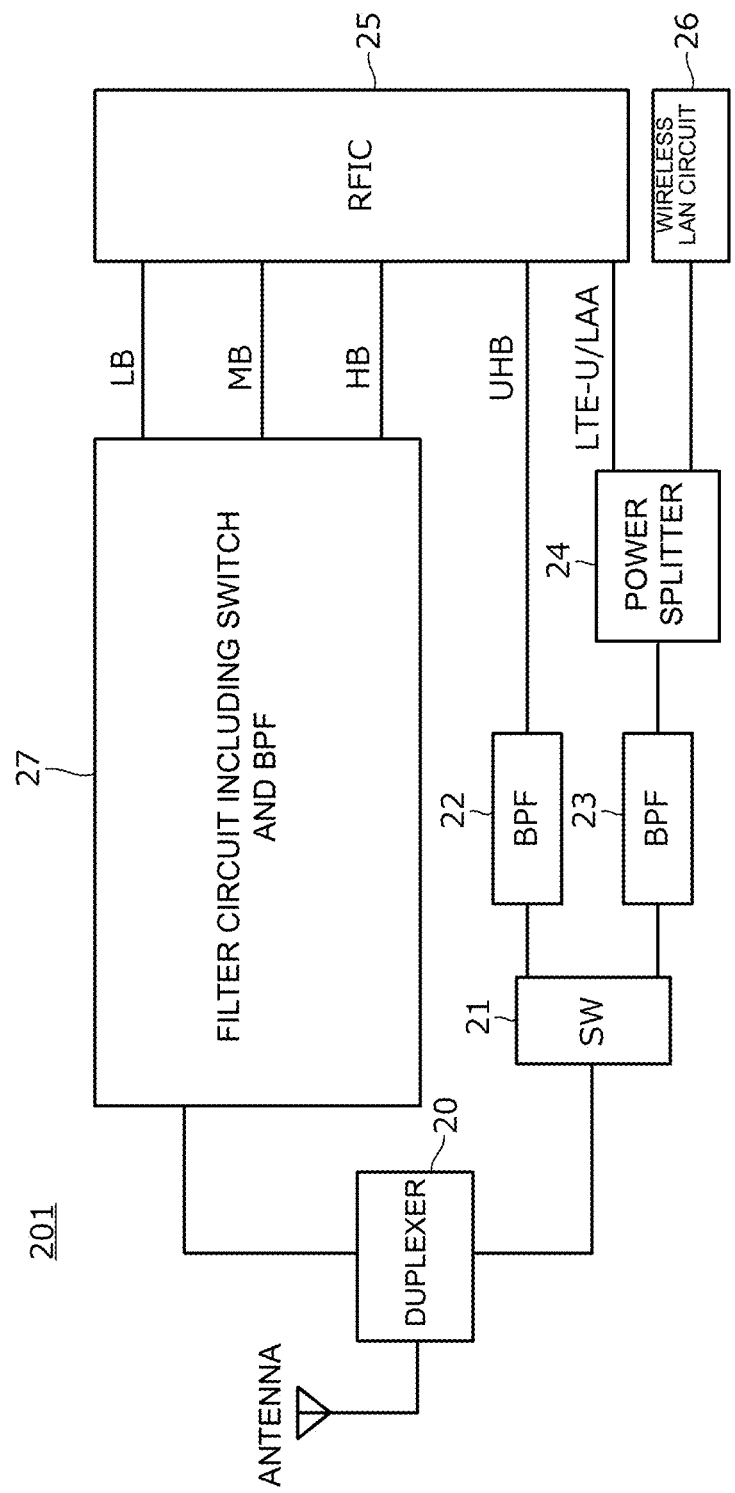
FIG. 9 is a block diagram of a communication apparatus 201 according to a fifth preferred embodiment of the present invention.
Figure 10:
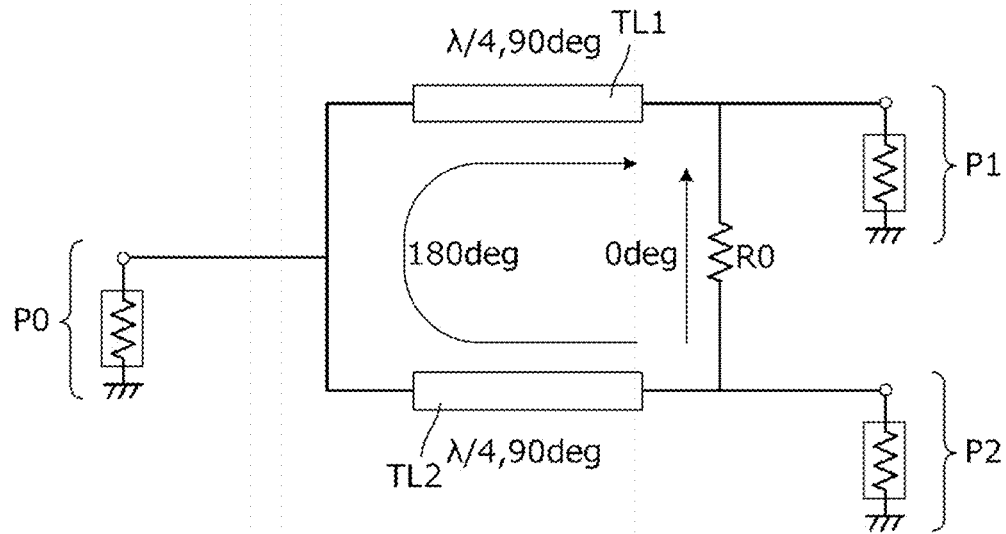
FIG. 10 is a circuit diagram of a Wilkinson power divider.

A communication apparatus including a power splitter will be described in a fifth preferred embodiment. FIG. 9 is a block diagram of a communication apparatus 201 according to the fifth preferred embodiment. The communication apparatus 201 includes a duplexer 20, a switch 21, bandpass filters 22 and 23, a power splitter 24, a radio-frequency integrated circuit (RFIC) 25, a wireless LAN circuit 26, and a filter circuit 27 including a switch and a BPF. Referring to FIG. 9, the wireless LAN circuit 26 corresponds to a "radio-frequency circuit". The power splitter 24 is provided between the radio-frequency circuit and an antenna. The RFIC 25 performs communication in the respective bands: a low band (LB), a middle band (MB), a high band (HB), an ultra-high band (UHB), and long-term evolution (LTE)-Unlicensed (LTE-U) and License Assisted Access (LAA) in an unlicensed band.

The power splitter 24 performs division and combination of an LTE-U/LAA communication signal and a wireless LAN communication signal. As in the example described above, the communication apparatus 201 including the power splitter 24 is provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power splitter comprising:
    a common port;
    a first port;
    a second port;
    a first phase shifter connected between the common port and the first port; and
    a second phase shifter connected between the common port and the second port; wherein
    the first phase shifter includes a first capacitor connected in series between the common port and the first port, a first inductor connected between the common port, an end portion at the common port side of the first capacitor, and ground, and a second inductor connected between the first port, an end portion at the first port side of the first capacitor, and the ground;
    the first inductor is magnetically coupled to the second inductor;
    the second phase shifter includes a second capacitor connected in series between the common port and the second port, a third inductor connected between the common port, an end portion at the common port side of the second capacitor, and the ground, and a fourth inductor connected between the second port, an end portion at the second port side of the second capacitor, and the ground; and
    the third inductor is magnetically coupled to the fourth inductor.

2. The power splitter according to claim 1, further comprising:
    a multilayer body including a plurality of dielectric layers laminated therein;
    the first inductor, the second inductor, the third inductor, the fourth inductor, the first capacitor, and the second capacitor are in the multilayer body.

3. The power splitter according to claim 1, wherein the first inductor and the third inductor are defined by a single inductor.

4. The power splitter according to claim 2, wherein
    the multilayer body includes a first dielectric layer, a second dielectric layer, a third dielectric layer, and a fourth dielectric layer and includes a first main surface and a second other main surface in a laminating direction of the dielectric layers;
    conductive patterns of the first inductor and the third inductor are on main surfaces of the first dielectric layer and the second dielectric layer;
    a conductive pattern of the second inductor is on a main surface of the third dielectric layer;
    a conductive pattern of the fourth inductor is on a main surface of the fourth dielectric layer;
    the first dielectric layer and the second dielectric layer are adjacent to each other in the laminating direction;
    the third dielectric layer is arranged at a side of the first main surface side viewed from the first dielectric layer; and
    the fourth dielectric layer is arranged at a side of the second main surface side viewed from the second dielectric layer.

5. The power splitter according to claim 4, wherein, in a plan view from the one main surface side of the multilayer body, the conductive patterns of the first inductor and the third inductor are arranged so that at least a portion of the conductive patterns of the first inductor and the third inductor is overlapped with the conductive pattern of the second inductor in a line length direction of the conductive patterns.

6. The power splitter according to claim 4, wherein, in a plan view from the one main surface side of the multilayer body, the conductive patterns of the first inductor and the third inductor are arranged so that at least a portion of the conductive patterns of the first inductor and the third inductor is overlapped with the conductive pattern of the fourth inductor in the line length direction of the conductive patterns.

7. The power splitter according to claim 1, wherein the first inductor and the second inductor define a transformer.

8. The power splitter according to claim 1, wherein the third inductor and the fourth inductor define a transformer.

9. The power splitter according to claim 1, wherein the first phase shifter and the second phase shifter rotate phases by 90 degrees.

10. The power splitter according to claim 1, further comprising an LC circuit to perform impedance matching.

11. The power splitter according to claim 1, wherein the first inductor is cumulatively connected to the second inductor, and the third inductor is cumulatively connected to the fourth inductor.

12. The power splitter according to claim 1, wherein the first inductor is differentially connected to the second inductor, and the third inductor is differentially connected to the fourth inductor.

13. The power splitter according to claim 2, further comprising terminals defining the common port, the first port, and the second port located on a bottom surface of the multilayer body and electrically connected to side electrodes on side surfaces of the multilayer body.

14. The power splitter according to claim 13, wherein no electrodes are provided on a top surface of the multilayer body.

15. The power splitter according to claim 2, wherein the first capacitor and the second capacitor are located closer to a mounting surface of the multilayer body and the first inductor and the second inductor are located farther away from the mounting surface of the multilayer body than the first capacitor and the second capacitor.

16. The power splitter according to claim 1, wherein the first inductor and the third inductor are magnetically coupled to define a differential connection generating mutual inductance.

17. The power splitter according to claim 1, further comprising multiple stages of phase shifters to perform division with unequal division ratio.

18. The power splitter according to claim 1, further comprising a plurality of the first phase shifter and a plurality of the second phase shifter.

19. The power splitter according to claim 1, wherein the power splitter is operable to perform division and combination of an LTE-U-LAA communication signal and a wireless LAN signal.

20. A communication apparatus comprising:
a radio-frequency circuit and an antenna connected to the radio-frequency circuit; wherein
the power splitter according to claim 1 is provided between the radio-frequency circuit and the antenna.

* * * * *